J. HEULINGS.
Potato Digger.
No. 17,856.
Patented July 21, 1857.
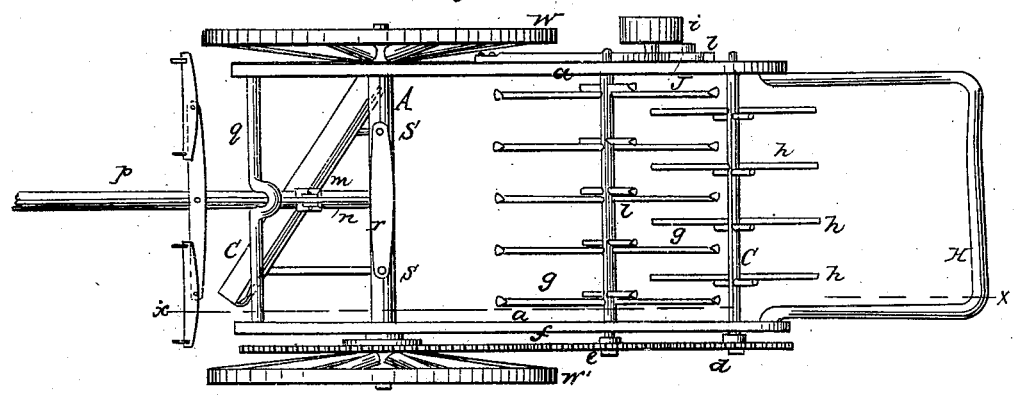
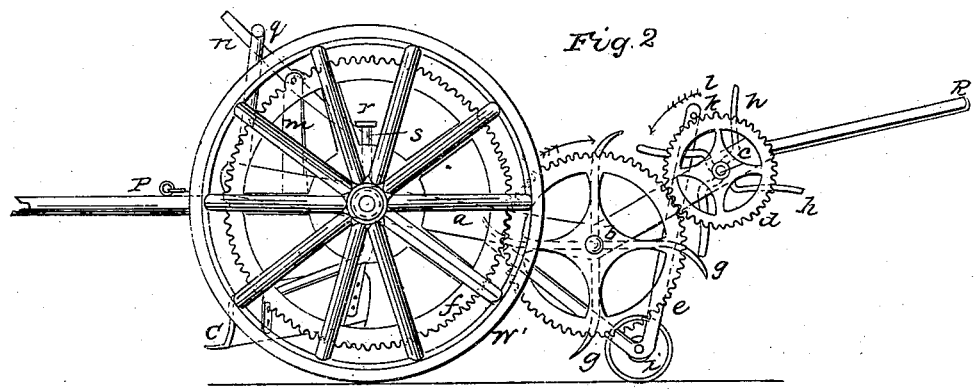
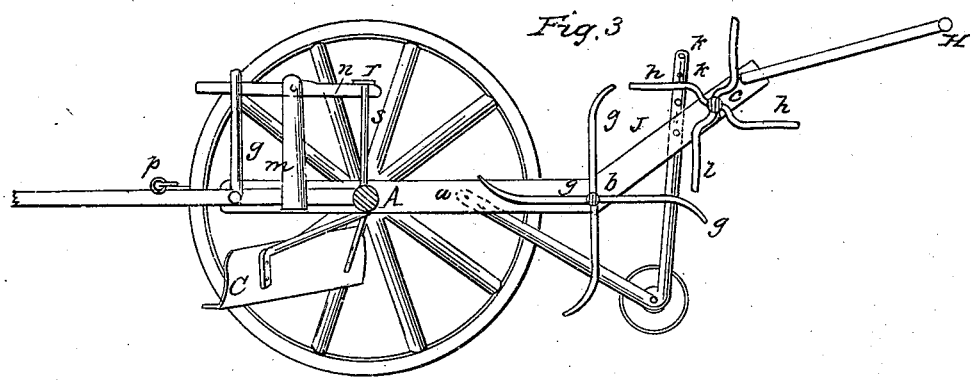

UNITED STATES PATENT OFFICE.

JOSEPH HEULINGS, OF PHILADELPHIA, PENNSYLVANIA, ASSIGNOR TO HIMSELF, W. H. LAWSON, AND B. M. HEULINGS, OF SAME PLACE.

IMPROVEMENT IN MACHINES FOR DIGGING POTATOES.

Specification forming part of Letters Patent No. 17,856, dated July 21, 1857.

*To all whom it may concern:*

Be it known that I, JOSEPH HEULINGS, of the city and county of Philadelphia, and State of Pennsylvania, have invented a new and useful Improvement in Potato-Diggers; and I do hereby declare that the following is a full, clear, and exact description of the construction and operation of the same, reference being had to the annexed drawings, forming part of this specification, in which—

Figure 1 is a top view of the machine. Fig. 2 is a side elevation in position for operation.

Fig. 3 is a vertical section on $x\ x$, showing the stalk-cutter and digging-teeth elevated for the passage of obstacles.

Similar characters of reference in the several figures denote the same part of the machine.

The nature of my invention consists in the breaking up of the potato-ridges and the removal of the potatoes therefrom by the action of rotary hooked teeth moving from rear to front, and in preventing said teeth from clogging by means of a secondary reel, operating as will be hereinafter set forth.

My invention further consists in certain devices for raising the stalk cutter by the lifting of the digging-teeth from the ground for the passage of obstacles and other purposes.

In the drawings, W W' are the wheels, and A their axle. This axle passes through the side pieces, $a\ a$, of the frame, so that the frame may turn freely upon the axle. Across the frame run the shafts $b$ and $c$, having on their respective ends the cog-wheels $d$ and $e$, the latter meshing with wheel $f$, attached to main wheel W', so as to cause the shafts to rotate, as shown by arrows in Fig. 2. Upon the shaft $b$ are the hooked teeth $g$, placed sufficiently close together to prevent an ordinary-sized potato from passing between them. The shaft $c$ is armed with teeth $h$, which pass between the teeth $g$ as the shafts $b$ and $c$ rotate. The rear of the frame rests upon the roller $i$, and is adjustable by reason of the holes $k$ in support $l$, which admit of the connecting-pin $j$ being shifted. This adjustment of course regulates the depth of digging. The draft-pole $p$ is secured to the axle A, and has upon it a standard, $m$, for holding the lever $n$. One extremity of this lever passes under the arched cross-piece $q$ of the frame and the other arm under the cap-piece $r$, connecting bars $s$, which hold the stalk-cutter C. These bars $s$ pass through the axle A, and are capable of movement in direction of their length. The rear of the frame is provided with a handle, H, by which the operator manages the machine.

The operation of the machine is as follows: The wheels W W' being designed to run in the furrows on each side of the potato-ridge, the rear of the frame is adjusted so that the teeth $g$ shall pass the requisite distance into the ground, the several parts of the machine having the relative position shown in Fig. 2. As the machine moves forward the knife C severs the stalks close to the upper portions of the ridge, and the revolution of the shaft $b$, as shown by arrow, causes the teeth $g$ to break up the ridge, and, carrying the potatoes upward, drop them in a clean state upon the surface of the ground in rear of the machine. The teeth $h$, passing between the digging-teeth, clear them of soil, which might pack between them. When an obstacle is to be passed the operator lifts the rear portion of the frame, thereby raising the teeth $g$. This movement depresses the front portion of the frame, causing the arch of cross-piece $q$ to draw downward the arm of lever $n$, which is under it, and thereby cause the other arm of the said lever to lift the stalk-cutter C so that it will pass over the obstacle. When the rear of the frame is dropped the stalk-cutter is free to fall to its operating position.

What I claim as new, and desire to secure by Letters Patent, is—

The combination of the rotary digger, oscillating frame, and oblique stalk-cutter, connected and operating substantially as specified, for the purpose set forth.

In testimony whereof I have hereunto signed my name before two subscribing witnesses.

JOSEPH HEULINGS.

Witnesses:
GEO. PATTEN,
JOHN S. HOLLINGSHEAD.